United States Patent Office 2,757,069
Patented July 31, 1956

2,757,069

SILVER TITANATES AND THEIR PREPARATION

Gordon D. Patterson and Henry M. Stark, Wilmington, Del., assignors to E. I. du Pont de Nemours and Company, Wilmington, Del., a corporation of Delaware No Drawing. Application September 30, 1954,
Serial No. 459,530

14 Claims. (Cl. 23—51)

This invention relates to new noble metal titanates and to their production. More particularly, this invention relates to noble metal titanates which are sensitive to light and are useful in the preparation of photosensitive materials.

Although oxygen-containing salts of titanium with alkali metals or with alkaline earths have been prepared in which titanium appears as the acidic constituent, no corresponding titanate of the noble metal class has been reported.

It is an object of this invention to provide new noble metal titanates and methods for their production. A further object is to provide silver titanates and methods for their production. A still further object is to provide silver titanates which are sensitive to light and are useful in the preparation of photosensitive materials. Other objects will appear hereinafter.

These and other objects of this invention are accomplished by providing silver titanates. These silver titanates can be represented by the formula $$Ag_2Ti_nO_{2n+1}$$

where $n$ is an integer of at least 1, and preferably 1 to 4. It has been found that silver titanates result from the reaction of silver oxide with titanium dioxide in a nonreactive fluid medium at a temperature of at least 300° C. and under a superatmospheric pressure of at least 20 atmospheres. The reaction is preferably conducted in the presence of water and oxygen under conditions of temperature and pressure such that supercritical water is present.

In the production of silver titanates, silver oxide is mixed with titanium dioxide and charged in a pressure-resistant vessel. To the vessel, a nonreactive fluid medium is added, which is generally water with a minor amount of oxygen. The temperature of the reaction should be at least 300° and preferably is 375° C. to 750° C. at a pressure of preferably at least 200 atmospheres.

The following examples further illustrate the preparation of the products of this invention.

EXAMPLE I

A total of 18.53 parts of silver oxide and 12.77 parts of titanium dioxide (anatase) (mole ratio of 1:2) were mixed together and charged into a platinum tube which was closed at one end but open at the upper end through a vent hole. This tube was placed in a bomb which was filled with water and oxygen, the amount of oxygen being such that at the final temperature and pressure the mole ratio of oxygen to water would be 3.5 to 96.5. The amount of water placed in the bomb was more than the weight of the solid charge but was slightly less than the calculated amount so that the bomb could be heated to 475° C. without exceeding 3000 atmospheres pressure. The bomb was then closed and heated to 475° C. and the pressure then adjusted to 3000 atmospheres by injection of water. The bomb was then held at 475° C. and 3000 atmospheres pressure for three hours and then cooled slowly. The product obtained was a pale cream-colored powder. On exposure to light, this product darkened rapidly.

Silver titanate of the formula, $Ag_2Ti_2O_5$, obtained by this general procedure had a density of 5.81. Analysis by X-ray diffraction pattern indicated that neither silver, silver oxide nor titanium dioxide (either as rutile or anatase) were present. The diffraction properties of silver and titanium dioxide are described in National Bureau of Standards Circular 539 on "X-ray Diffraction Powder Patterns" while the pattern for silver oxide is described in ASTM card number 1–1041. The following (Table I) gives the interplanar spacings and relative intensities for the X-ray diffraction pattern for this silver titanate.

Table I

| Interplanar Spacing (Angstroms) | Relative Intensity | Interplanar Spacing (Angstroms) | Relative Intensity |
|---|---|---|---|
| 6.23 | 20 | 2.32 | 40 |
| 4.84 | 10 | 2.12 | 15 |
| 3.06 | 70 | 1.85 | 20 |
| 2.93 | 70 | 1.73 | 20 |
| 2.90 | 35 | 1.69 | 20 |
| 2.57 | 100 | 1.64 | 10 |
| 2.51 | 30 | 1.52 | 20 |
| 2.43 | 15 | 1.49 | 15 |
| 2.37 | 20 | 1.46 | 10 |

EXAMPLE II

The general procedure of Example I was repeated except that the molar ratio of the silver oxide and titanium dioxide was 1:1. The product, $Ag_2TiO_3$, was olive yellow in color. Well-defined X-ray diffraction patterns were obtained which indicated the product contained no silver, silver oxide or titanium dioxide. This silver titanate had a density of 6.58. The X-ray diffraction pattern for this compound gave the spacings and relative intensities as recorded in Table II.

Table II

| Interplanar Spacing (Angstroms) | Relative Intensity | Interplanar Spacing (Angstroms) | Relative Intensity |
|---|---|---|---|
| 8.26 | 10 | 2.20 | 10 |
| 6.91 | 20 | 1.94 | 15 |
| 3.02 | 10 | 1.90 | 20 |
| 2.74 | 50 | 1.60 | 15 |
| 2.71 | 100 | 1.56 | 10 |
| 2.59 | 100 | 1.52 | 10 |
| 2.51 | 30 | 1.51 | 15 |

EXAMPLE III

In equipment as described in Example I, silver oxide and titanium dioxide were charged in a molar ratio of 1 to 1. The reactants were prepared by precipitating silver oxide (from silver nitrate and sodium hydroxide) in a titanium dioxide slurry (obtained by hydrolysis of titanyl sulfate and removal of sulfate). The mole ratio of oxygen to water in the apparatus was 7:93. The charge was heated at 625° C. for 3 hours under 3000 atmospheres pressure. There was obtained olive yellow silver titanate, $Ag_2TiO_3$, identified by its X-ray diffraction pattern, which corresponded to that of the product of Example II.

EXAMPLE IV

When the general procedure of Example III was repeated except the ratio of silver oxide to titanium dioxide was 1:2, the product obtained was pale cream colored and had the diffraction pattern characteristic for $Ag_2Ti_2O_5$ as given in Example I, Table I.

EXAMPLE V

When the general procedure of Example IV was repeated except that no water was used and the pressure was about 200 atmospheres of oxygen, cream-colored but slightly gray $Ag_2Ti_2O_5$ was obtained. The X-ray diffraction pattern of this product corresponded to that of Example I.

When pressures of 1700–1800 atmospheres of oxygen were employed at 625° C., the product obtained was pale cream in color and had the X-ray diffraction pattern of the silver titanate, $Ag_2Ti_2O_5$ as in Example I, Table I.

EXAMPLE VI

Silver oxide and titanium dioxide (prepared as described in Example III) were charged in a molar ratio of 1 to 1. No water was added to the reaction vessel. The pressure at 625° C. was 850 atmospheres of oxygen for 3 hours. There was obtained a bright yellow silver titanate ($Ag_2TiO_3$) whose X-ray diffraction pattern corresponded to that of Example II (Table II).

When this general procedure was repeated except the pressure was 1800 atmospheres of oxygen, a similar bright yellow silver titanate ($Ag_2TiO_3$) was obtained.

EXAMPLE VII

When the general procedure of Example III was repeated except the mole ratio of silver oxide to titanium dioxide was 1:3 (as required to give the titanate $Ag_2Ti_3O_7$), the product obtained was a light tan silver titanate ($Ag_2Ti_3O_7$) having a new X-ray diffraction pattern whose spacings and relative intensities are given in Table III below.

Table III

| Interplanar Spacing (Angstroms) | Relative Intensity | Interplanar Spacing (Angstroms) | Relative Intensity |
|---|---|---|---|
| 7.19 | 55 | 2.69 | 15 |
| 3.58 | 40 | 2.47 | 60 |
| 3.49 | 10 | 2.43 | 100 |
| 3.14 | 10 | 2.38 | 35 |
| 3.04 | 50 | 2.26 | 15 |
| 2.92 | 45 | 1.87 | 15 |
| 2.85 | 100 | 1.81 | 10 |
|  |  | 1.63 | 15 |

EXAMPLE VIII

When the mole ratio was 1:4 of silver oxide (commercial C. P. grade) to titanium dioxide (calcined anatase) in the procedure which otherwise corresponded to that of Example III, a pale yellow product was obtained for which X-ray diffraction patterns had no $TiO_2$ lines but had new lines resulting from the formation of the silver titanate, $Ag_2Ti_4O_9$. The X-ray data are given in Table IV below.

Table IV

| Interplanar Spacing (Angstroms) | Relative Intensity | Interplanar Spacing (Angstroms) | Relative Intensity |
|---|---|---|---|
| 7.69 | 80 | 2.79 | 50 |
| 4.23 | 20 | 2.68 | 40 |
| 3.48 | 40 | 2.56 | 100 |
| 3.05 | 70 | 2.49 | 35 |
| 2.97 | 75 | 2.19 | 45 |
| 2.89 | 35 | 2.04 | 50 |
|  |  | 1.98 | 15 |

EXAMPLE IX

When the general procedure of Example VIII was repeated except that the molar ratio of silver oxide to titanium dioxide was 1:8, the product obtained was cream colored. From X-ray analysis the product had rutile (possibly some anatase) and silver titanates whose X-ray diffraction patterns corresponded to a mixture of the silver titanates of Tables III ($Ag_2Ti_3O_7$) and IV ($Ag_2Ti_4O_9$).

EXAMPLE X

Into a platinum tube was charged an intimate mixture of 17.27 parts of silver and 12.77 parts of titanium dioxide (anatase). The charge corresponded to a molar ratio of silver oxide to titanium dioxide of 1:2. This was slurried in 24 parts of water. The tube, which had a small orifice, was placed inside a pressure-resistant vessel containing about 105 parts of water. The vessel was pressured to 2235 lbs./sq. in. pressure of oxygen gas. This resulted in a concentration of 7 mole per cent of oxygen in the water vapor upon heating the assembly to 475° C. and adjusting total pressure to 3000 atmospheres by injection of water. After three hours, the assembly was cooled and the product removed. X-ray diffraction analysis confirmed the presence of the silver titanate in the product corresponding to that of Example I, Table I.

In a similar procedure, when metallic silver (prepared from silver hydroxide) and titanium dioxide were charged in a ratio corresponding to a silver oxide to titanium dioxide molar ratio of 1 to 2 and heated with water and 7 mole per cent of oxygen at 625° C. for 3 hours at 3000 atmospheres, the product obtained had X-ray diffraction properties which corresponded to those of Table I (Example I), i. e., of the silver titanate $Ag_2Ti_2O_5$.

EXAMPLE XI

An intimate mixture of 29 parts of silver oxide and 10 parts of titanium dioxide (mole ratio of 1:1) was prepared in an agate mortar. About 12 parts of this mixture along with about an equivalent weight of water was charged in a platinum tube which had a vent hole. The tube was placed in a pressure vessel and heated at 625° C. with the pressure at about 3000 atmospheres for 1.5 hours. After cooling, the reaction product was removed from the tube. It was dark in color. X-ray diffraction analysis indicated the absence of silver oxide and titanium dioxide (either as anatase or rutile). The lines obtained showed the presence of silver as the metal and a silver titanate. The lines were substantially the same in spacing and intensity as given in Table I of Example I for the titanate $Ag_2Ti_2O_5$.

The products of this invention are silver titanates. These silver titanates have the general formula $Ag_2Ti_nO_{2n+1}$ where $n$ is an integer of at least 1. The examples illustrate silver titanates of this general formula where $n$ is 1 to 4. The preferred titanates have a value of $n$ of not over 3. For convenience, these new compounds can be written as $Ag_2O:nTiO_2$ wherein $n$ is an integer as defined above. These compounds are generally of yellow to a pale cream in color and have characteristic X-ray diffraction patterns. They have different densities, e. g., the density of $Ag_2TiO_3$ is 6.58, whereas that of $Ag_2Ti_2O_5$ is 5.81.

The particular titanate or mixture of titanates obtained is dependent upon the ratios of reactants, i. e., silver oxide and titanium dioxide, employed as well as the conditions. In the reaction, a temperature of at least 300° C. is employed under a superatmospheric pressure of at least 20 atmospheres and preferably of at least 100 atmospheres. When water is present, it is preferred that conditions of supercritical temperature and pressure be employed, i. e., pressures of at least 218 atmospheres and temperatures of at least 374° C. The presence of water facilitates the reaction and is a preferred means of regulating pressure. Although silver titanates have been obtained at pressures of approximately 140 atmospheres, pressures of up to 3000 atmospheres are usually employed although pressures of 10,000 atmospheres or higher can be used.

The equipment, or reaction vessels, in which the reaction is carried out must be able to withstand high pressure and be inert to the reactants or fluid medium that is present. Injection of water into the reaction vessel is a method that can be employed to maintain pressures of up to 3000 atmospheres.

Although water is a useful means of maintaining superatmospheric pressure and providing a nonreactive fluid medium for the reaction, other fluids can be employed. The nonreactive fluid medium can be any fluid medium which does not react in such manner as to introduce an additional element into the final product. Particularly preferred is oxygen or mixtures of oxygen and water. The fluid employed is generally above its critical temperature and pressure.

As previously mentioned, the products of this invention are obtained by heating the silver oxide/titanium dioxide charge at a temperature of at least 300° C. and preferably at least 375° C. The upper limit of temperature is not critical, but temperatures of above 750° C. are usually not used since equipment capable of handling such high temperatures with corresponding pressures is not readily available.

In the reaction for the preparation of the products of this invention, it is necessary that silver oxide be present to react with titanium dioxide under the herein disclosed conditions of temperatures and pressure. The silver oxide can be employed as freshly precipitated silver oxide or by the oxidation of silver to silver oxide with oxygen (as shown in Example X) under the reaction conditions. It is preferable to use silver oxide as such and intimately mix it with the reactive amount of titanium dioxide. A particularly effective method to insure uniform mixture of the reactants is to mix a hydrous titanium dioxide, such as obtained by hydrolysis of titanium sulfate or titanium tetrachloride, with a silver nitrate solution, followed by addition of sodium hydroxide solution. The resultant slurry upon washing and filtration can be charged directly into the reaction vessel. The ease of reaction is influenced by such factors as the particle size and intimacy of mixing. Impurities including the presence of other anions should be avoided.

The titanium dioxide is preferably used in the form of the hydrated titanium oxide although pigment-grade titanium dioxide can be used. When calcined pigment-grade titanium dioxide is used, the reaction may proceed more slowly.

The reactive amounts of silver oxide and titanium dioxide charged in the reaction vessel are preferably in the ratio desired in the final product. Titanium dioxide is generally present in at least equivalent amounts to the silver oxide. The ratio of silver oxide to titanium dioxide on a molar basis is generally within the range of 1:1 to 1:10. When $Ag_2TiO_3$ is desired as the ultimate product, the charge is preferably in the molar ratio of 1:1. When $Ag_2Ti_2O_5$ is desired, the $TiO_2$ ratio is generally doubled although the ultimate yield of the specific titanate is dependent upon other factors in the reaction, such as the temperature and pressure employed. In the reaction, best results are obtained when the metal oxides are thoroughly mixed and loosely packed which conditions permit penetration by the fluid medium, e. g., oxygen and water.

The time required for the formation of silver titanate from silver oxide and titanium dioxide can vary within wide limits. The use of high temperatures reduces the time involved for conversion. In general, times of one to five hours are sufficient. However, longer times, such as thirty hours or more, can be employed if desired.

All of the silver titanates of this invention have the unusual property of being sensitive to light. On exposure to light they form latent images which can be developed in orthodox photographic developers. Photographic prints have been made on papers coated with a 2.6 to 4 per cent suspension of $Ag_2Ti_2O_5$ in a 5 per cent gelatin solution. The "emulsion" was made by ball milling the silver titanate in water to form a slurry. The silver titanates are thus particularly useful in the preparation of photosensitive materials. The addition of small amounts of heavy metal salts, such as chromium or mercury salts, makes the composition less light sensitive. Such salts are to be avoided when maximum sensitivity is desired.

The silver titanates of this invention also exhibit photoconductivity. Sinterings made from the silver titanates are semiconductors of electricity.

As many apparently widely different embodiments of this invention may be made without departing from the spirit and scope thereof, it is to be understood that this invention is not limited to the specific embodiments thereof except as defined in the appended claims.

We claim:

1. A silver titanate of the formula $Ag_2Ti_nO_{2n+1}$ where $n$ is an integer of 1 to 4.

2. A silver titanate of the formula $Ag_2Ti_2O_5$.

3. Process for preparing a silver titanate which comprises reacting silver oxide with titanium dioxide in a non-reactive fluid medium at a temperature of 300° to 750° C. and under a superatmospheric pressure of at least 20 atmospheres, and separating as the resulting product a silver titanate which is sensitive to light and corresponds to the formula $Ag_2Ti_nO_{2n+1}$ where $n$ is at least 1.

4. Process for preparing a silver titanate which comprises reacting silver oxide with titanium dioxide in a non-reactive fluid medium at a temperature of 375° to 750° C. under superatmospheric pressure within the range of 200 to 3000 atmospheres, and separating as the resulting product a silver titanate which is sensitive to light and corresponds to the formula $Ag_2Ti_nO_{2n+1}$ where $n$ is at least 1.

5. Process for preparing a silver titanate which comprises reacting silver oxide with titanium dioxide in water at a temperature of 300° to 750° C. under a superatmospheric pressure of at least 20 atmospheres, and separating as the resulting product a silver titanate which is sensitive to light and corresponds to the formula $Ag_2Ti_nO_{2n+1}$ where $n$ is at least 1.

6. Process for preparing a silver titanate which comprises reacting silver oxide with titanium dioxide in water at a temperature of 375° to 750° C. under a superatmospheric pressure within the range of 200 to 3000 atmospheres, and separating as the resulting product a silver titanate which is sensitive to light and corresponds to the formula $Ag_2Ti_nO_{2n+1}$ where $n$ is at least 1.

7. A silver titanate of the formula $Ag_2Ti_nO_{2n+1}$ where $n$ is an integer of at least 1.

8. A silver titanate which is sensitive to light and is characterized by an X-ray diffraction pattern in which the line of maximum intensity corresponds to an interplanar spacing of about 2.57 A., and in which the second most intense lines are two of about equal intensity corresponding to interplanar spacings of about 2.93 A. and 3.06 A. respectively.

9. A silver titanate of the formula $Ag_2TiO_3$.

10. A silver titanate which is sensitive to light and is characterized by an X-ray diffraction pattern in which the lines of maximum intensity are two of about equal intensity corresponding to interplanar spacings of about 2.59 A. and 2.71 A. respectively, and in which the next most intense line corresponds to an interplanar spacing of about 2.74 A.

11. A silver titanate of the formula $Ag_2Ti_3O_7$.

12. A silver titanate which is sensitive to light and is characterized by an X-ray diffraction pattern in which the lines of maximum intensity are two of about equal intensity corresponding to interplanar spacings of about 2.43 A. and 2.85 A. respectively, and in which the next most intense line corresponds to an interplanar spacing of about 2.47 A.

13. A silver titanate of the formula $Ag_2Ti_4O_9$.

14. A silver titanate which is sensitive to light and is characterized by an X-ray diffraction pattern in which the line of maximum intensity corresponds to an interplanar spacing of about 2.56 A. in which the second most intense line corresponds to an interplanar spacing of about 7.69 A. and in which the third most intense line corresponds to an interplanar spacing of about 2.97 A.

References Cited in the file of this patent

UNITED STATES PATENTS

| | | |
|---|---|---|
| 1,929,521 | Ryan | Oct. 10, 1933 |
| 2,140,236 | Lederle | Dec. 13, 1938 |
| 2,218,655 | Peterson | Oct. 22, 1940 |
| 2,563,307 | Burham et al. | Aug. 7, 1951 |

OTHER REFERENCES

Gmelin - Kraut: "Handbuch der Anorganischen Chemie," Band V, Abt. 2, page 1489, Carl Winter's Universitatsbachhandlung, (1914).